Figure 1:
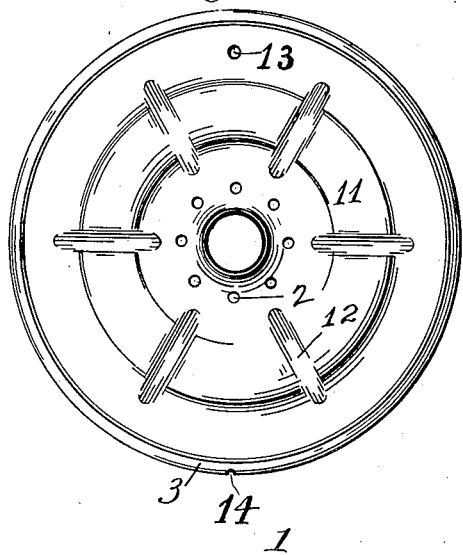

R. T. J. MARTIN.
PRESSED METAL WHEEL.
APPLICATION FILED DEC. 21, 1906.

912,010.

Patented Feb. 9, 1909.
2 SHEETS—SHEET 1.

Witnesses:
A. L. Lord
Brennan B. West

Inventor,
Robert T. J. Martin
By Bates, Fouts & Hull,
Attorneys.

R. T. J. MARTIN.
PRESSED METAL WHEEL.
APPLICATION FILED DEC. 21, 1906.
912,010.
Patented Feb. 9, 1909.
2 SHEETS—SHEET 2.
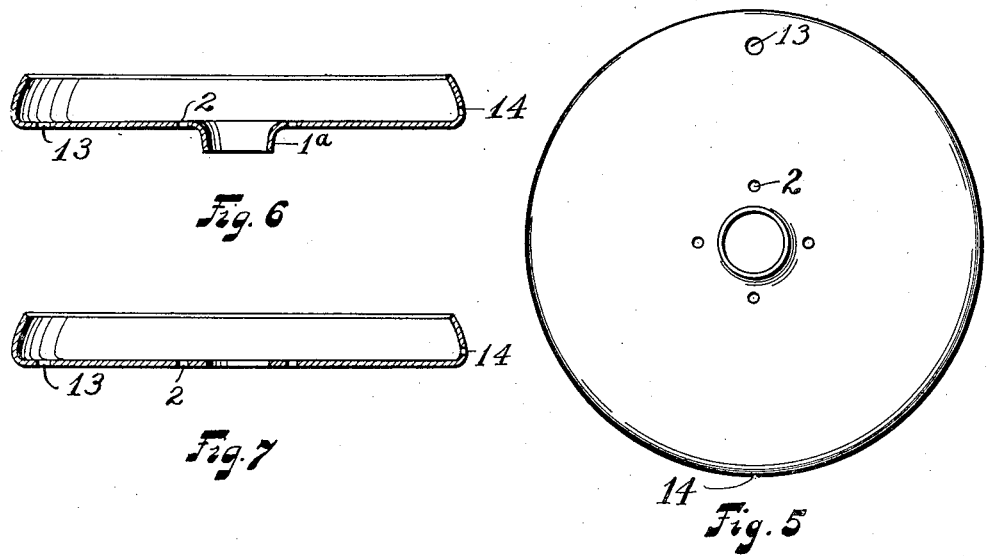
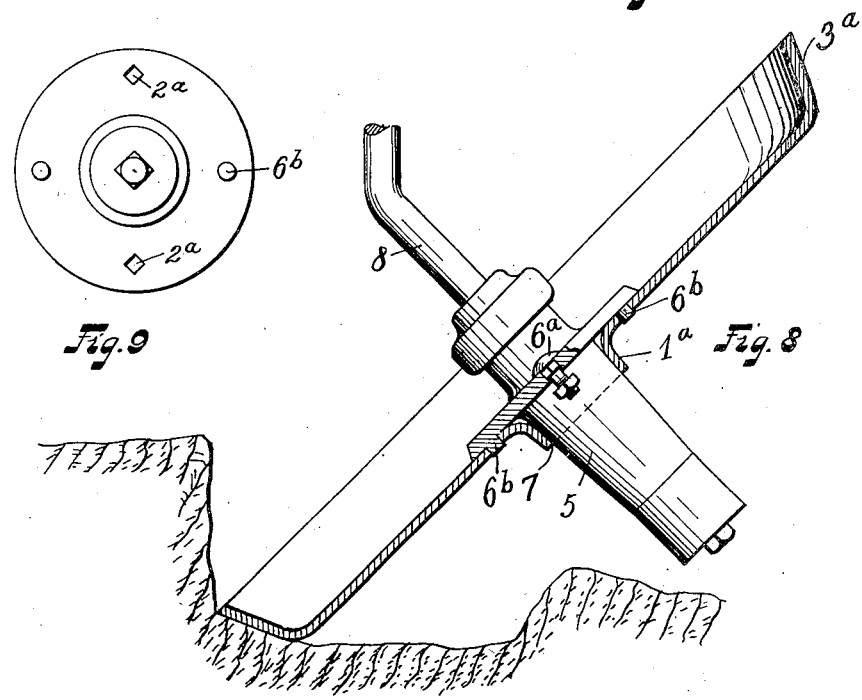
Witnesses:
Inventor,
Robert T. J. Martin
By Bates, Fouts & Hull,
Attorneys.

UNITED STATES PATENT OFFICE.

ROBERT T. J. MARTIN, OF LORAIN, OHIO.

PRESSED-METAL WHEEL.

No. 912,010.  Specification of Letters Patent.  Patented Feb. 9, 1909.

Application filed December 21, 1906. Serial No. 348,906.

*To all whom it may concern:*

Be it known that I, ROBERT T. J. MARTIN, residing at Lorain, in the county of Lorain and State of Ohio, have invented a certain new and useful Improvement in Pressed-Metal Wheels, of which the following is a full, clear, and exact description, reference being had to the accompanying drawings.

My invention relates to wheels, and more especially to wheels adapted for use with agricultural implements, such as sulky plows, and has for its object the production of a wheel of this type made entirely of pressed metal and provided with simple and effective means for attaching the same to the hub and with a rim flange or tread so formed as to utilize substantially the full width of the tread when the axle is inclined at any desired predetermined angle. I accomplish these results by the construction illustrated in the drawings, set forth in detail in the specification, and embodied in the claims hereto annexed.

Figure 2:
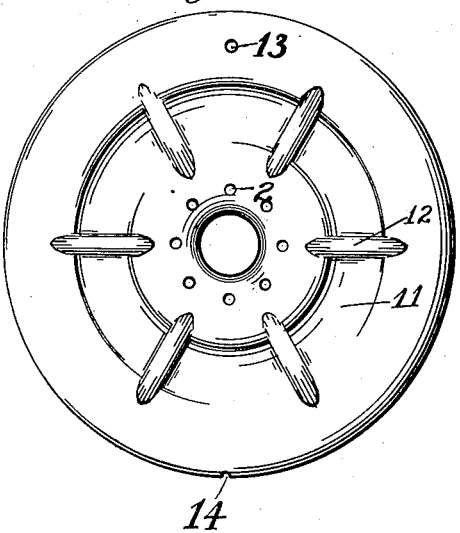
Figure 2:
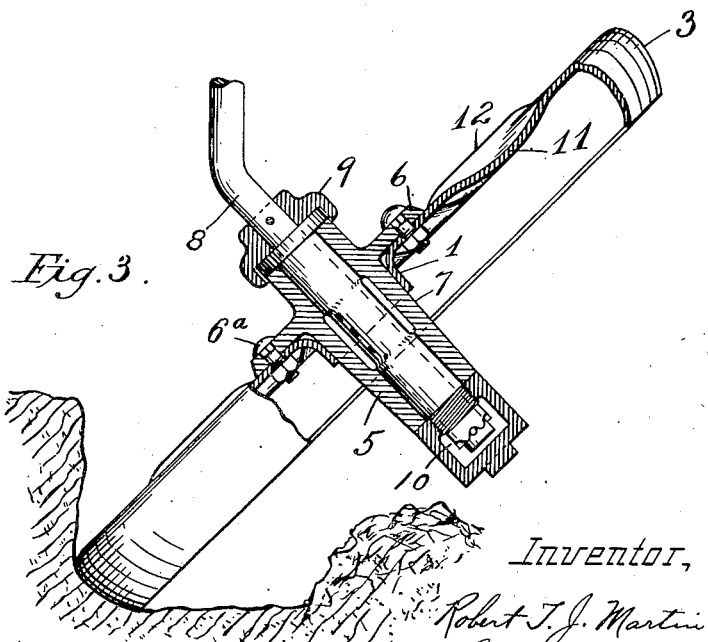

In the drawings which form part of this application, Figure 1 represents an outside elevation of one form of my wheel unattached to a hub; Fig. 2 represents a similar view of the reverse side of the wheel; Fig. 3 represents a view, partly in elevation and partly in section, showing said wheel attached to the axle of an agricultural implement; Fig. 4 represents a sectional view through the center of a modified form of wheel; Fig. 5 represents an elevation of the wheel shown in Fig. 4; Figs. 6 and 7 represent sectional views through the centers of still further modified forms of my wheel, Fig. 8 represents a sectional view through the center of another form of my wheel, showing the same applied to a hub, the hub and part of the hub flange being shown in elevation and a part of the hub flange being broken away, and Fig. 9 represents an elevation of the hub and flange shown in Fig. 8.

In constructing my wheel, I take a sheet of metal and provide the central portion thereof with an opening, which may be swaged to form a flange 1. The wall of the flange converges slightly from the opening in the sheet to form an inclined inner surface adapted to fit upon the hub of the vehicle or implement. Surrounding this flange and at a short distance therefrom are the openings 2, for a purpose to be hereinafter described. At its outer edge, the metal plate is bent outwardly by means of suitable dies to form the tread 3.

Owing to the fact that, with implements such as sulky plows, one wheel rolls within the furrow in the angle or corner formed by the landside of the plow, I may give to the tread a conformation that will adapt it to roll within such angle or corner and utilize substantially the entire outer surface of the tread when the wheel is inclined at the desired angle.

I form the tread shown in Figs. 1-7 by first providing the blank with a flange at substantially right angles thereto and then, by the use of contracting dies, turn the outer end of the flange inwardly, to provide a tread of rounded contour, the general direction of which is at an acute angle with the body or web of the wheel. The wheel thus formed may be readily fitted to any of the standard types of hubs which are used with agricultural implements with but slight alteration in such hubs. In Fig. 3, I have shown the wheel as applied to a hub 5, which is of a well known type, except that I provide it with a flange 6, which is adapted to receive the rear surface of the wheel web and abut squarely thereagainst. By means of bolts $6^a$ extending through the holes $2^a$ in the flange and through corresponding holes 2 in the wheel, the wheel is secured to the hub. The bolt holes in the flange are preferably square or angular in outline to correspond with the contour of the square or angular necks of the bolts. Some of the bolt holes 2 in the wheel are preferably circular and are adapted to receive, in addition to the bolts, lugs $6^b$ projecting from the hub flange and fitting said holes, said lugs being preferably circular in section. The purpose of the lugs is to prevent the wheel from turning with respect to the wheel flange as well as to prevent the shearing of the bolts. The internal diameter of the central opening in the wheel is such as to enable the flange 1 to be slipped 10 over the exterior of hub 5, and said hub may be provided with a slightly tapered portion 7, extending outwardly from the flange 6 and conforming to the taper of the flange 1, which fits closely around such tapered portion when the wheel is in place against flange 6. The hub is carried by an axle 8 of standard construction having a dust or sand cap 9 and an oil cap 10.

In order to strengthen the wheel, I may provide the same with an annular corrugation 11, intermediate of the center and periphery. To further strengthen the same, I may also provide the wheel with a suitable number of ribs 12, pressed therefrom, said ribs extending radially of the wheel and constituting in effect, spokes. Furthermore, I provide the wheel with a perforation 13 located at a short distance from and within the tread, also with a small perforation 14 diametrically opposite perforation 13 and located in the tread at the extreme outward projection thereof. The perforation 13 serves two purposes, viz. to receive a clutch pin to hold the wheel against rotation when so desired, and also as a means for suspending the wheel, as from a hook or similar suspending device for the purpose of transportation or for supporting the wheel when it is desired to paint the same. The perforation 14 serves as a drain opening and, being diametrically opposite the perforation 13, will permit of the escape of any surplus paint or any moisture that may accumulate within the tread. Perforations 13 and 14 are preferably in diametrical line with two of the perforations 2, as the clutch pin referred to above is thrown into the perforation 13 only when one or more of the perforations 2 are in a vertical line. By locating two of these perforations and the perforations 13 and 14 in the same diametrical line, the clutch pin is thrown into perforation 13 when said perforation is in its uppermost position, which leaves the perforation 14 in position to drain the wheel and the rim flange.

In Fig. 4 I have shown a form of wheel similar to that illustrated in Figs. 1, 2 and 3, except that the wheel in Fig. 4 is not provided with an annular corrugation or the radial ribs or spokes. In Figs. 5 and 6, the wheel is similar to that shown in Fig. 4, except that the central flange 1ª extends in a direction the reverse of the direction of flange 1. In Fig. 7, the wheel is the same as in Fig. 6, except that the central flange is entirely omitted. In Fig. 8, the wheel is the same as in Figs. 5 and 6, except that the tread 3ª forms an obtuse angle with the plane of the web.

Particular points of advantage in my wheel reside in the cheapness of production thereof, as the same may be formed from a single blank of sheet metal by comparatively inexpensive manipulation; the adaptability of the same to existing types of vehicles or implements with but slight and inexpensive changes in the construction of the hubs to apply the wheel thereto; and the strength and efficiency of the same due to the mode of construction.

Having described my invention, what I claim is:—

1. The combination, with a hub having a flange projecting laterally therefrom, of a pressed metal wheel having a central opening adapting it to be applied to said hub, means for securing said wheel to said flange, and lugs projecting from said flange and adapted to be applied to perforations in said wheel.

2. The combination, with a hub having a flange projecting laterally therefrom, said flange being provided with one or more lugs and with one or more perforations, of a pressed metal wheel having a central opening adapting it to be applied to said hub, said wheel having a perforation or perforations corresponding and adapted to receive said lug or lugs and with another perforation or perforations corresponding to the perforation or perforations in the flange, and securing means extending through the alined perforations in the flange and wheel.

3. A pressed metal wheel having a web and a tread flange and provided with diametrically opposite perforations therethrough, one of said perforations being provided in the portion of said flange which is at the greatest distance from the center and the other perforation being provided in said web.

4. A pressed metal wheel having a web and an integral tread flange forming an acute angle with said web, said wheel being provided with diametrically opposite perforations, one of said perforations being provided at substantially the junction of said web and flange to constitute a drain opening, and the other perforation being provided in the web between the flange and the central portion of the wheel.

5. A pressed metal wheel comprising a web having a central opening therethrough and perforations adjacent to said opening, a flange forming an angle with said web and constituting a tread, said wheel having a drain opening in the peripheral portion thereof and a perforation in the web within said flange, the last-mentioned perforations and one or more of the perforations adjacent to the central opening being in substantially the same diametrical line.

6. A wheel for the purpose specified comprising a web having a central opening adapting it for application to a hub, said web having an integral peripheral flange constituting a tread, an annular corrugation intermediate of said opening and flange, and radially extending corrugations or ribs interposed between said opening and flange, substantially as specified.

In testimony whereof, I hereunto affix my signature in the presence of two witnesses.

ROBERT T. J. MARTIN.

Witnesses:
J. B. HULL,
ALBERT H. BATES.